United States Patent Office 2,856,901
Patented Oct. 21, 1958

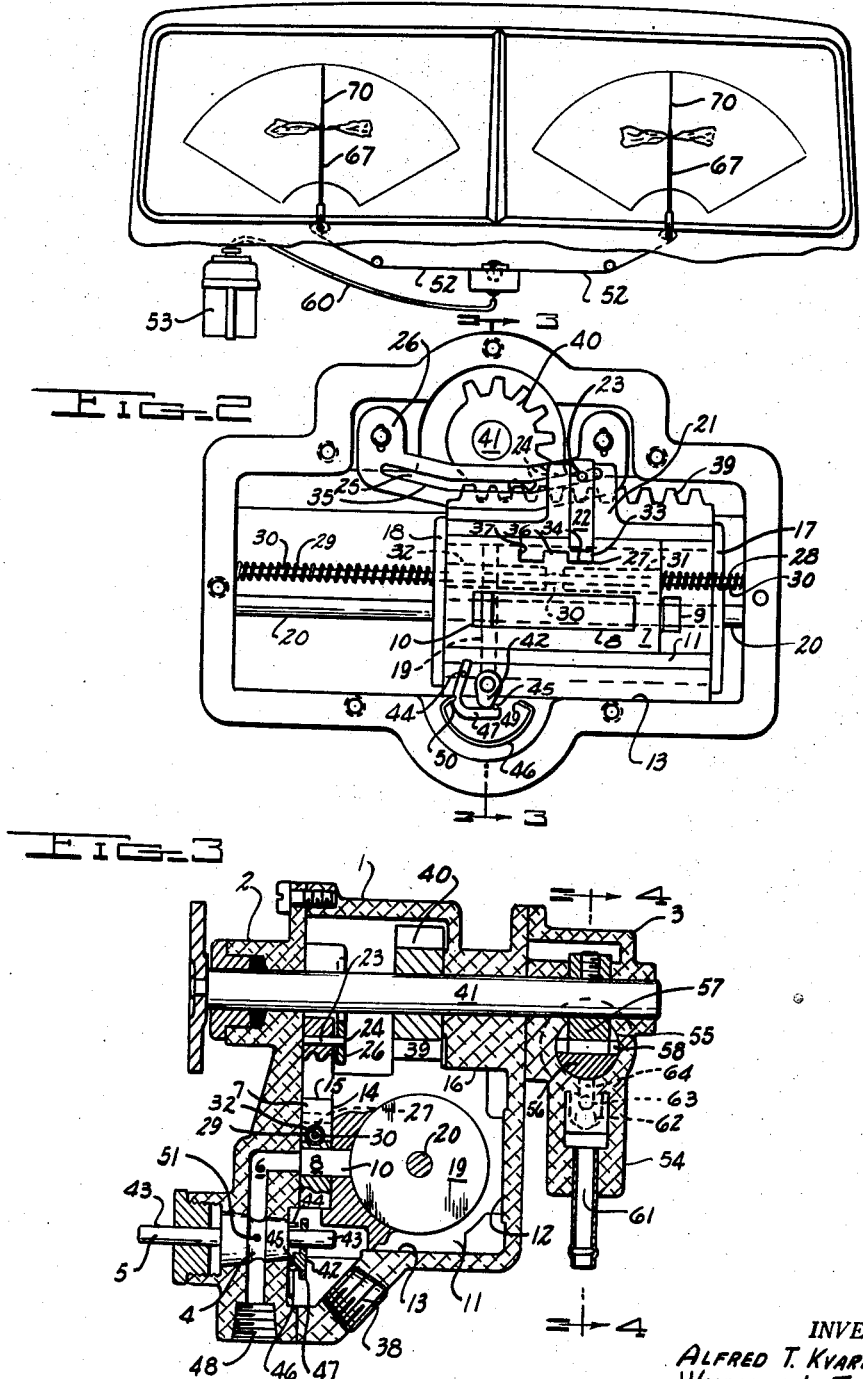

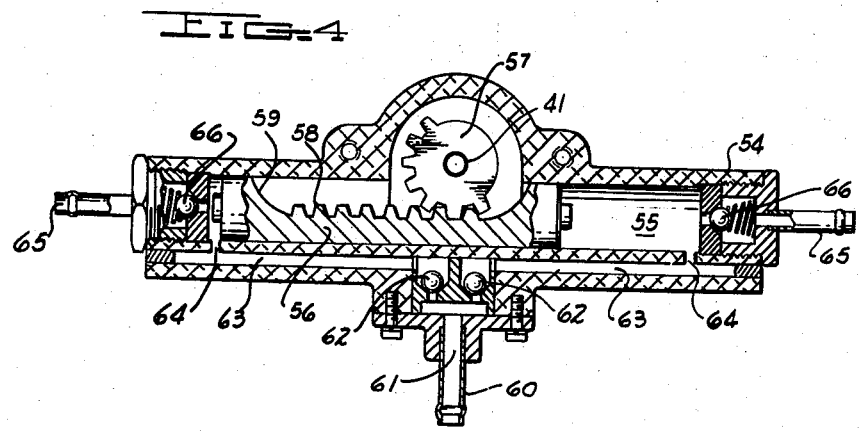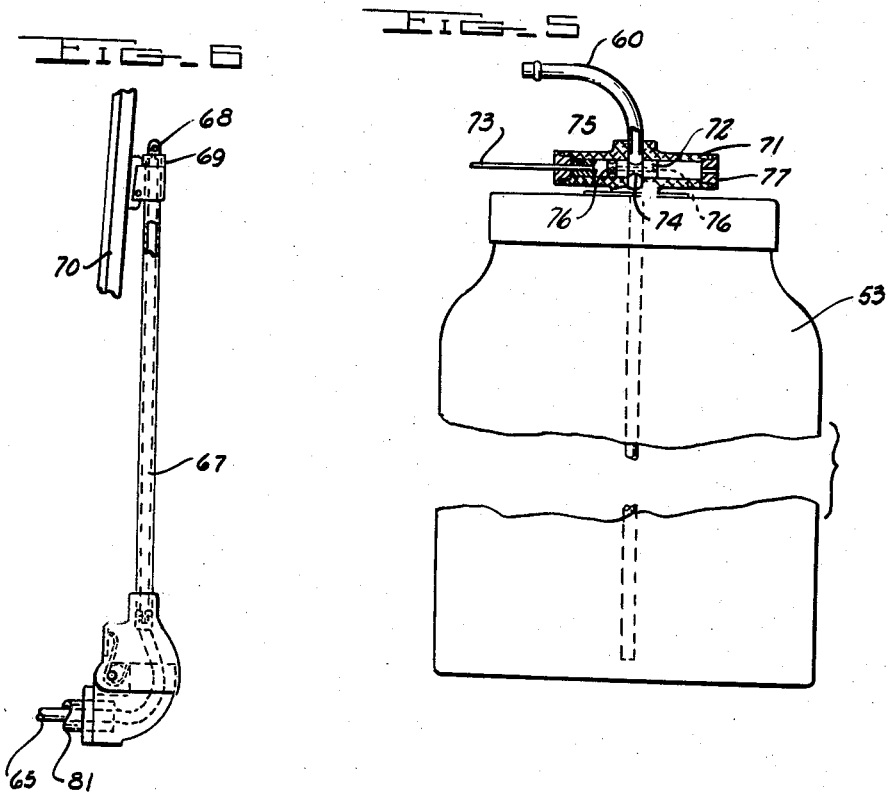

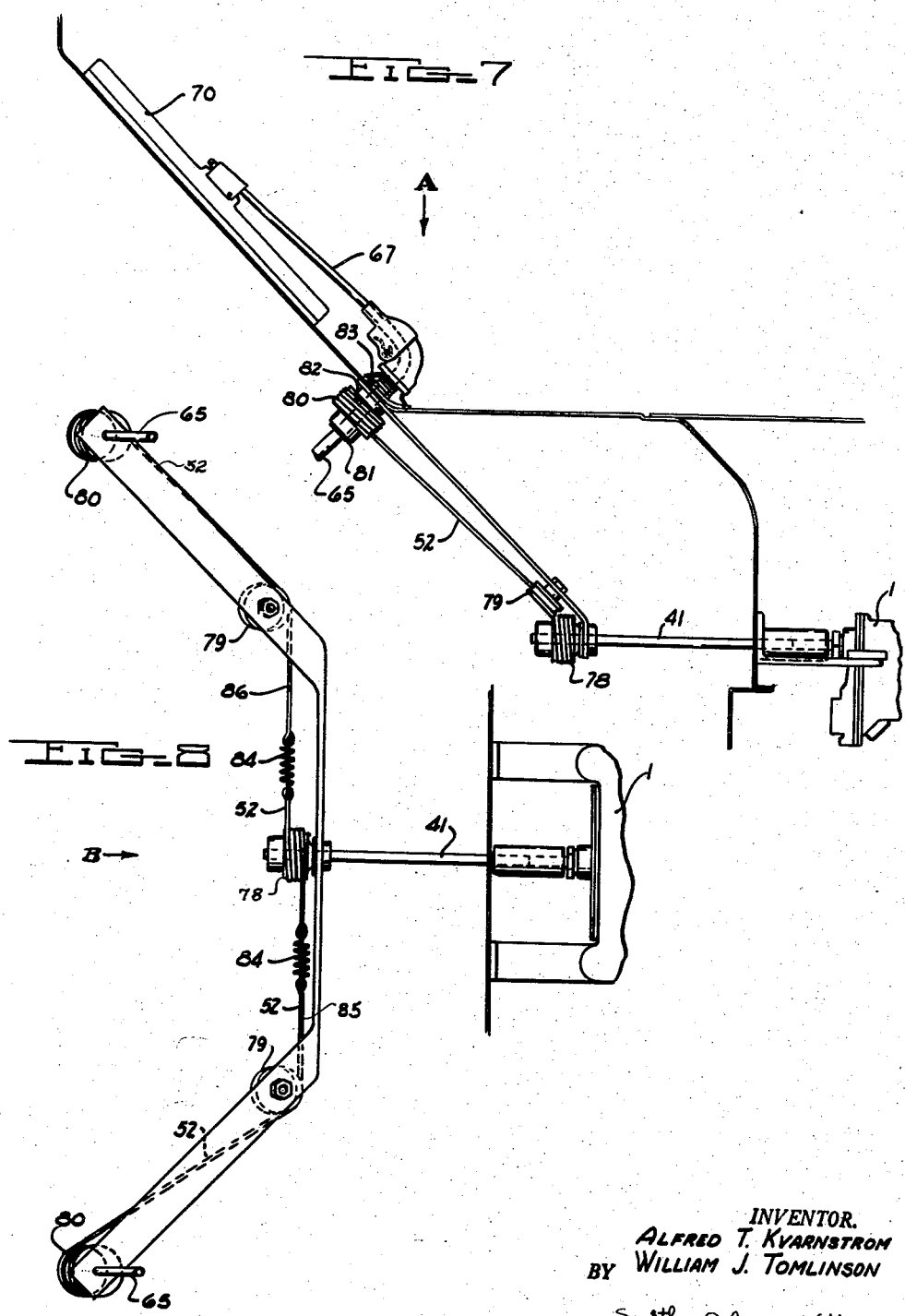

2,856,901

WINDSHIELD WIPER MOTOR

Alfred T. Kvarnstrom, Walled Lake, and William J. Tomlinson, Detroit, Mich., assignors to K & T Engineering & Developing Company, Walled Lake, Mich., a corporation of Michigan Application May 19, 1954, Serial No. 430,792

5 Claims. (Cl. 121—50)

This invention relates to a hydraulically operated windshield wiper motor, pumping system for spraying water on the wiper blades, and cord-pulley drive between the motor and wiper.

In part at least the instant invention is an improvement on Patent No. 2,194,045 issued to Alfred T. Kvarnstrom.

In the above noted Kvarnstrom patent, the hydraulic motor includes a cylinder slidably mounted on a fixed piston and provided with a reciprocable valve plate for changing the point of entry of high pressure oil into the cylinder whereby the cylinder can reverse its direction of motion to cause a reciprocation of the windshield wiper blades. For the most part of its travel the valve plate moves with the cylinder but as the cylinder approaches its limit of travel the valve plate contacts and compresses a spring. As the spring becomes compressed it is intended to snap the valve plate back relative to the cylinder to change the point of entry of high pressure oil into the cylinder. It is an object of the present invention to secure a greater compression of the spring than has heretofore been possible whereby the valve plate will be assured of snapping back relative to the cylinder.

It is also an object of the invention to equip the hydraulic motor with a pump for moving cleaning fluid from a suitable tank directly up to the wiper blades whereby the windshield can be cleaned mechanically without stopping the vehicle.

It is a further object to provide a belt-cord drive between the motor and wipers which is composed of a minimum number of parts and performs its function with a minimum expenditure of power.

Other objects of this invention will appear in the following description and appended claims, reference being had to the accompanying drawings forming a part of this specification wherein like reference characters designate corresponding parts in the several views.

In the drawings:

Figure 1 is a front view of a vehicle windshield which is equipped with a motor and washing unit constructed according to the invention.

Figure 2 is a front view of the hydraulic motor with the front cover plate removed.

Figure 3 is a view taken on line 3—3 of Figure 2.

Figure 4 is a view taken on line 4—4 of Figure 3.

Figure 5 is a view to an enlarged scale of the water supply tank shown in Figure 1.

Figure 6 shows a wiper arm constructed according to the invention.

Figure 7 is a view taken at right angles to Figure 1.

Figure 8 is a view taken in the direction of arrow A in Figure 7.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring more specifically to Figures 1 through 3 of the drawings, the construction there illustrated can be seen to include a motor housing 1 having a cover plate 2 and a water pump 3. High pressure oil (from a convenient source as for example the oil pump, or the hydraulic members used in power steering, top actuation and power brakes) is admitted to the motor through inlet 48 to passage 4 of rotatable valve 5, from where it flows through passage 6 to reciprocable valve plate 7. Valve 5 will be manually operated from the automobile dash board to start and stop the windshield wipers by controlling admission of high pressure fluid into passage 6. As the oil leaves passage 6 it flows through rectangular aperture 8 (formed in plate 7) into one of openings 9 and 10 (depending on the position of plate 7) formed in one wall of cylinder 11. In the Figure 2 position of plate 7 aperture 8 will be in registry with opening 10. Cylinder 11 is provided with flat faces 12, 13, 14, 15, and 16 for its slidable mounting within housing 1. Circular end plates 17 and 18 provide the cylinder with a chamber into which the high pressure oil is admited. Within the cylinder is disposed piston 19 fixedly mounted on immovable rod 20. As the high pressure oil flows into the cylinder through opening 10 (Fig. 2) it pushes against the left face of fixed piston 19 and the inner face of end plate 18, thereby causing the cylinder to move to the left. Mounted for vertical reciprocation within an extension 21 of cylinder 11 is a vertical bar 22, which carries a pin 23. As cylinder 11 moves to the left, pin 23 will move down in declined portion 24 of slot 25 formed in fixed plate 26, thereby causing bar 22 to move downwardly into notch 27 cut in the upper edge of plate 7. Compression coil springs 28, 29 (of equal strength), mounted on fixed rod 30, are received in bores 31 and 32, formed in plate 7. In the Figure 2 position spring 28 is compressed to a greater degree than spring 29 thereby causing face 33 of notch 27 to remain in contact with the adjacent edge of bar 22 whereby cylinder 11 and plate 7 will move to the left as a unit. On continued leftward movement of the cylinder and valve plate the relative strengths of springs 28 and 29 will be changed due to the change in their relative lengths but by the time spring 29 becomes compressed into a shorter length than spring 28 the lowermost end of bar 22 will be seated against face 34 of the notch whereby cylinder 11 and plate 7 will continue to move leftward. When pin 23 reaches inclined portion 35 of slot 25 bar 22 will be lifted out of notch 27. As soon as the lowermost end of the bar moves above shoulder 36 plate 7 will be moved to the right in a snap action (under the influence of compressed spring 29) until face 37 strikes the left edge of bar 22 whereupon opening 9 will be in registry with aperture 8. Opening 10 will now be in position beyond the left edge of plate 7 to exhaust the high pressure oil into the interior of housing 1 and out through outlet 38. Incoming high pressure oil will now move through opening 9 and push against the right face of piston 19 and end plate 17 whereby cylinder 11 and plate 7 will move as a unit to the right back to the Figure 2 position.

The power derived from the reciprocation of the cylinder is transmitted to the windshield wiper blades through rack 39 fixed on the upper face of the cylinder and sector gear 40 fixed on drive shaft 41.

When valve 5 is turned to shut off the motor it is necessary that the motor stop only at the end of its stroke so that the windshield wiper blades will not project into the automobile driver's line of vision in their idle positions. The means for insuring that cylinder 12 will stop at the end of its stroke (when valve 5 is turned to the closed position) includes an off center cam 42 rigidly mounted on valve stem 43 for ninety degree rotation between stop pins 44 and 45, mounted on the inside face of cover plate 2. Arcuate spring 46 has two inturned ends, one of which is fastened on cover plate 2 at 49 and the other of which is fastened at 50 on L-shaped arm 47. When the motor is running spring 46 will be prevented by cam 42 from pushing arm 47 into the path of plate 7. However when valve 5 is turned to close passage 4 the off center portion of cam 42 will be rotated upwardly to contact stop pin 44 whereupon spring 46 will be free to urge arm 47 upward into the path of plate 7. Assuming that cylinder 11 and plate 7 are moving to the right when valve 5 is closed, opening 9 will be in registry with aperture 8 and bar 22 will be in engagement with the left face of shoulder 36. As the left edge of plate 7 passes the vertical leg of arm 47 spring 46 will urge the arm upwardly to prevent the plate from moving back to the left. On continued movement to the right, bar 22 will be lifted out of engagement with shoulder 36, whereupon spring 28 will snap plate 7 to the left until the left edge of said plate contacts arm 47, in which position bar 22 will be directly over shoulder 36 and aperture 8 will not be in registry with either of openings 9 or 10 but between them. Since high pressure oil cannot enter either of openings 9 or 10 cylinder 11 will not move from its end position and the windshield wipers will stop below the driver's line of vision.

In order that cylinder 11 can move to its rightmost position after valve 5 is closed, a small passageway 51 is provided for admitting oil when passage 4 is closed off.

It is contemplated that the above described motor could be provided with a relief mechanism similar to that shown in previously noted Patent No. 2,194,045 at 20, 21, 22 or 25, 26.

In addition to its function of reciprocating the windshield wiper blades (by means of cables 52) drive shaft 41 has the further function of driving water pump 3. The pump will carry water from tank 53 to the windshield wipers when the driver wishes to clean dirt from his windshield without stopping the automobile.

Referring more specifically to pump 3 it can be seen to include a housing 54 having a circular portion bored therethrough to form a cylinder 55, within which is slidably mounted a circular piston 56. The means for moving the piston consists of a sector gear 57 carried by drive shaft 41 and a rack section 58 formed in hollowed out portion 59 of the piston.

Water taken from tank 53 through tube 60 passes up through inlet 61 to unseat balls 62 and flow through passages 63 and 64 into cylinder 55, from where it is pushed past spring urged balls 66 into outlet tubes 65 by piston 56. The outlet tubes are each connected to a hollow wiper arm 67, the outer end of which is provided with a nozzle 69 having two diametrically opposed holes 68 for spraying water on opposite sides of wiper blade 70.

At times it is desirable to have the windshield wipers in operation without having an accompanying spray of water. In order to cut off the spray of water without stopping the wipers a valve is positioned between tube 60 and tank 53. This valve consists of a cylindrical housing 71, circular piston 72 and control wire 73 leading to a control knob (not shown) on the automobile dashboard. Cut into the surface of piston 72 is an endless notch 74 for allowing water to flow up from tank 53 into tube 60. A second endless notch, shown at 75, communicates with passage 76 in the interior of the piston. In the Figure 5 position notch 74 will allow water to flow from tank 53 into tube 60. If it is desired to stop the flow of water without stopping the windshield wipers, control wire 73 is pushed to the right until notch 75 comes into registry with tube 60, whereupon the supply of water will be cut off and air will be sucked in through apertured screw 77, passage 76 and up tube 60.

Referring now to Figures 7 and 8, and more particularly to the cord-pulley drive there illustrated, the construction is seen to include a pulley 78 fixed on shaft 41. A single nylon cord 52 is wound around pulley 78 and runs under two idler pulleys 79 and up to be anchored at 82 in grooved hubs 80 (fixed on wiper drive shaft 81). Each of shafts 81 is provided with a coil spring 83 for moving the wiper arm as the cord is unwound from drive pulley 78. Tension springs 84 are provided for taking up any slack caused by a stretching of the nylon cord after a period of use.

Relative to the operation of the drive, assuming the viewer is looking in the direction of arrow B in Figure 8 and shaft 41 is rotating in a counterclockwise direction, portion 85 of cord 52 will be wound up on pulley 78 and portion 86 will be unwound from pulley 78. Coil spring 83 for the left wiper will be free to rotate the wiper and take up slack on portion 86. When pulley 78 rotates in a clockwise direction coil spring 83 for the right wiper will rotate its wiper and cord portion 86 will wind up on pulley 78 to rotate the left wiper.

From the foregoing description, taken in conjunction with the accompanying drawings, it can be seen that a windshield wiper motor, pumping system for cleaning fluid and cord-pulley drive means have been provided wherein the motor is assured of reversing its direction of motion, the pumping system will effectively transmit cleaning fluid from a source of supply to the wiper blades, and the cord-pulley drive means will perform its function with a minimum expenditure of power.

Having thus described our invention, we claim:

1. A hydraulically operated windshield wiper motor comprising; a housing having an inlet port and an outlet port; a piston and means fixedly mounting it in said housing; a cylinder slidably mounted on said piston and having two openings therein; an apertured valve plate and means mounting it for slidable movement in a path parallel to the path taken by said cylinder; an elongated cam member fixed in said housing and having a track portion extending parallel to the path of said cylinder, a first cam portion at one end of said track portion and extending away from the path of said cylinder, and a second cam portion at the other end of said track portion extending away from the path of said cylinder; a bar mounted on said cylinder for slidable movement at right angles to the path of the cylinder, and having a projection thereon in engagement with said cam member; said valve plate having two spaced shoulders and a third shorter shoulder therebetween; a rod extending through said valve plate in a direction parallel to the path of said valve plate; and a coil spring supported on the rod between the valve plate and an abutment at each end of said rod; whereby high pressure liquid may be admitted through the inlet port, into the aperture in the valve plate, and through one of the cylinder openings thereby causing the cylinder to move relative to the piston with a simultaneous movement of said projection along one of said cam portions and a movement of said bar into the space between said shorter shoulder and one of said two shoulders to cause the valve plate to move as a unit with the cylinder until the projection moves into engagement with the other of said cam portions whereupon the bar will be moved out of the aforementioned space and one of said springs will be compressed more than the other to shift the valve plate away from the direction taken by the cylinder and cause the bar to engage the other of said two shoulders, in which position the aperture in the valve plate will be in registry with the other of said cylinder openings and the one cylinder opening will be in registry with the interior of the housing whereby high pressure fluid flowing through said other cylinder opening will move the cylinder away from its initial direction and cause fluid to be exhausted through said one opening, into the housing and out said outlet port.

2. A hydraulically operated windshield wiper motor comprising; a housing having an inlet port and an outlet port; a piston and means fixedly mounting it in said housing; a cylinder slidably mounted for reciprocating movement on said piston and having an opening at each of its ends; an apertured valve plate and means mounting it for slidable movement in a path parallel to the path taken by said cylinder; and means between said cylinder and valve plate causing them to move as a unit; said means including a fixed cam, a cam-engaging bar slidably mounted on said cylinder for movement normal to the cylinder's path into and out of engagement with any one of a plurality of detents on said valve plate, and spring means between said valve plate and said housing; whereby as the cylinder approaches the limit of its movement the cam will release the bar from engagement with the detents to permit the spring means to shift the valve plate relative to the cylinder and cause the aperture in said valve plate to move from registry with one to the other of said cylinder openings.

3. A hydraulically operated windshield wiper motor comprising; a housing having an inlet port and an outlet port; a piston and means fixedly mounting it in said housing; a cylinder slidably mounted on said piston and having two openings therein; an apertured valve plate and means mounting it for slidable movement in a path parallel to the path taken by said cylinder; an elongated cam member fixed in said housing and having a track portion extending parallel to the path of said cylinder, a first cam portion at one end of said track portion and extending away from the path of said cylinder, and a second cam portion at the other end of said track portion extending away from the path of said cylinder; a bar mounted on said cylinder for slidable movement at right angles to the path of the cylinder, and having a projection thereon in engagement with said cam member; said valve plate having two spaced shoulders and a third shorter shoulder therebetween; a rod extending through said valve plate in a direction parallel to the path of said valve plate; and a coil spring supported on the rod between the valve plate and an abutment at each end of said rod.

4. A hydraulically operated windshield wiper motor comprising; a housing having an inlet port and an outlet port; a piston and means fixedly mounting it in said housing; a cylinder slidably mounted for reciprocating movement on said piston and having an opening at each of its ends; an apertured valve plate in communication with said inlet and means mounting it for slidable movement in a path parallel to that taken by said cylinder; and means between said cylinder and valve plate causing them to move as a unit; said means including a fixed cam, a cam-engaging bar slidably mounted on said cylinder for movement into and out of engagement with any one of a plurality of detents on said valve plate; and spring means between said valve plate and said housing; whereby as the cylinder approaches the limit of its movement the cam will release the bar from engagement with the detents to permit the spring means to shift the valve plate relative to the cylinder and cause the aperture in said valve plate to move from registry with one of said cylinder openings to the other of said cylinder openings.

5. In a hydraulically operated windshield wiper motor comprising; a housing having an inlet port and an outlet port, a piston; a cylinder slidably mounted for reciprocating movement on said piston and having an opening at each of its ends; an apertured valve plate in communication with said inlet and means mounting it for slidable movement in a path parallel to that taken by said cylinder; a rotatable valve between the inlet port and said valve plate; means between said cylinder and valve plate causing them to move as a unit when said cylinder is intermediate its end positions and relatively when said cylinder is at either of its end positions; and means retaining said cylinder in one of its end positions; said retaining means including a cam mounted for rotation with said valve, an L-shaped arm, and spring means between the housing and an intermediate point on said arm for urging it into the path of said valve plate; rotation of said valve to the open position serving to bring the cam into camming engagement with one leg of said arm thereby withdrawing the other leg of said arm from the path of said valve plate.

References Cited in the file of this patent

UNITED STATES PATENTS

| | | |
|---|---|---|
| 2,173,021 | Longwell | Sept. 12, 1939 |
| 2,372,813 | Darling | Apr. 3, 1945 |
| 2,397,599 | Folberth | Apr. 2, 1946 |
| 2,458,260 | Gray | Jan. 4, 1949 |
| 2,538,344 | Wahlberg | Jan. 16, 1951 |
| 2,572,750 | Oishei | Oct. 23, 1951 |
| 2,574,504 | Sivacek | Nov. 13, 1951 |
| 2,639,455 | Schwarzmann | May 26, 1953 |